United States Patent [19]

Mourou

[11] 4,425,652

[45] Jan. 10, 1984

[54] LASER SYSTEM USING ORGANIC DYE AMPLIFIER

[75] Inventor: Gerard Mourou, Rochester, N.Y.

[73] Assignee: The University of Rochester, Rochester, N.Y.

[21] Appl. No.: 162,842

[22] Filed: Jun. 25, 1980

[51] Int. Cl.$^3$ .............................................. H01S 3/09
[52] U.S. Cl. ...................................... 372/69; 372/18; 372/5; 372/97
[58] Field of Search .................. 331/94.5 P, 94.5 ML, 331/94.5 L

[56] References Cited

PUBLICATIONS

"Mode Locking of an Organic Dye Laser" by Glenn et al; *App. Phys. Lett.*, vol. 12, No. 2, Jan. 15, 1968.
"A Mode-Locker on Dye Laser" by Denes; *App. Phys. Lett.*, vol. 19, No. 8, Oct. 15, 1971.
"Mode-Locking of the CW Dye Laser" by Kuizenga; *App. Phys. Lett.*, vol. 19, No. 8, 1971
"Subpicosecond Kilowatt Pulses from a Mode-Locked CW Dye Laser" by Shank et al.; *App. Phys. Lett.*, vol. 24, No. 8, Apr. 1974.
"Comparison of Synchronous Pumping and Passive Mode-Locking of CW Dye Lasers for the Generation of Picosecond and Subpicosecond Light Pulses" *Opt. Comm.* (27) (1),78. Ryan et al.
"A Subpicosecond Dye Laser Directly Pumped by a Mode-Locked Argon Laser" by Ferguson et al; *J. Appl. Phys.*, 49 (11) Nov. 1978.
"CW Mode-Locked Source at 0.532μ" by Murray et al; *IEEE Jour. Quan. Elecl.*, vol. QE-10, No. 2, Feb. 1979.
"Solid State Laser Engineering" by Koechner, Springer-Verlar (1976).
"Powerful Dye Laser Oscillator-Amplifier System for High Resolution and Coherent Pulse Spectroscopy" by Salour; *Op. Comm.* (22), 2, 1977 p. 207.
"A Frequency Locker Single Pulser Dye Laser" by Pinaro et al; *Opt. Comm.*, vol. 20, No. 3, Mar. 1977.
"Time Resolves Spectroscopy with Subpicosecond Optical Pulses"; by Shank et al, proceed. of 2nd Int. Conf. on Laser Spect. Megave, France (23-27 Jun. 1975), pp. 408-419.
"Pulse Generation in a CW Dye Laser by Mode--Locked Synchronous Pumping" by Harris et al.; *App. Phys. Lett.*, vol. 26, No. 1, Jan. 1, 1975.
"Subpicosecond Pulses from a Turnable CW Mode--Locked Dye Laser" by Heritage et al., *App. Phys. Lett.*, vol. 32, No. 2, Jan. 15, 1973.
"Bandwidth-Limited Subpicosecond Pulse Generation in Mode Locked CW Dye Lasers" by Ruddock et al., *App. Phys. Lett.*, vol. 29, No. 5, Sep. 1, 1976.
"Ultrashort Light Pulses Picosecond Techniques and Applications" edited by S. L. Shapiro, Springer Verlag, New York, 1977, (#8, Methods of Generation).

*Primary Examiner*—William L. Sikes
*Assistant Examiner*—Leon Scott, Jr.
*Attorney, Agent, or Firm*—Martin Lukacher

[57] ABSTRACT

A laser system generates high energy ultra-short pulses using a dye cell amplifier driven by ultra-short pulses from a dye laser and pumped by pump pulses from a laser amplifier. The laser amplifier and dye laser are synchronously driven and pumped by the same laser such that the signal pulse from the dye laser arrives at the dye cell amplifier immediately upon the completion of population inversion therein in response to the pump pulse. Efficient high-power, ultra-short laser pulses are obtained from the dye amplifier, since amplified spontaneous emission (ASE) is avoided. Doubler crystals are used to provide the pump pulses to the dye laser from the common driver laser and to provide pump pulses from the laser amplifier to the dye cell amplifier at the proper wave length for the materials used therein. This system is tunable by selecting appropriate dyes for the dye laser and dye cell amplifier and/or tuning elements within the dye laser cavity.

22 Claims, 1 Drawing Figure

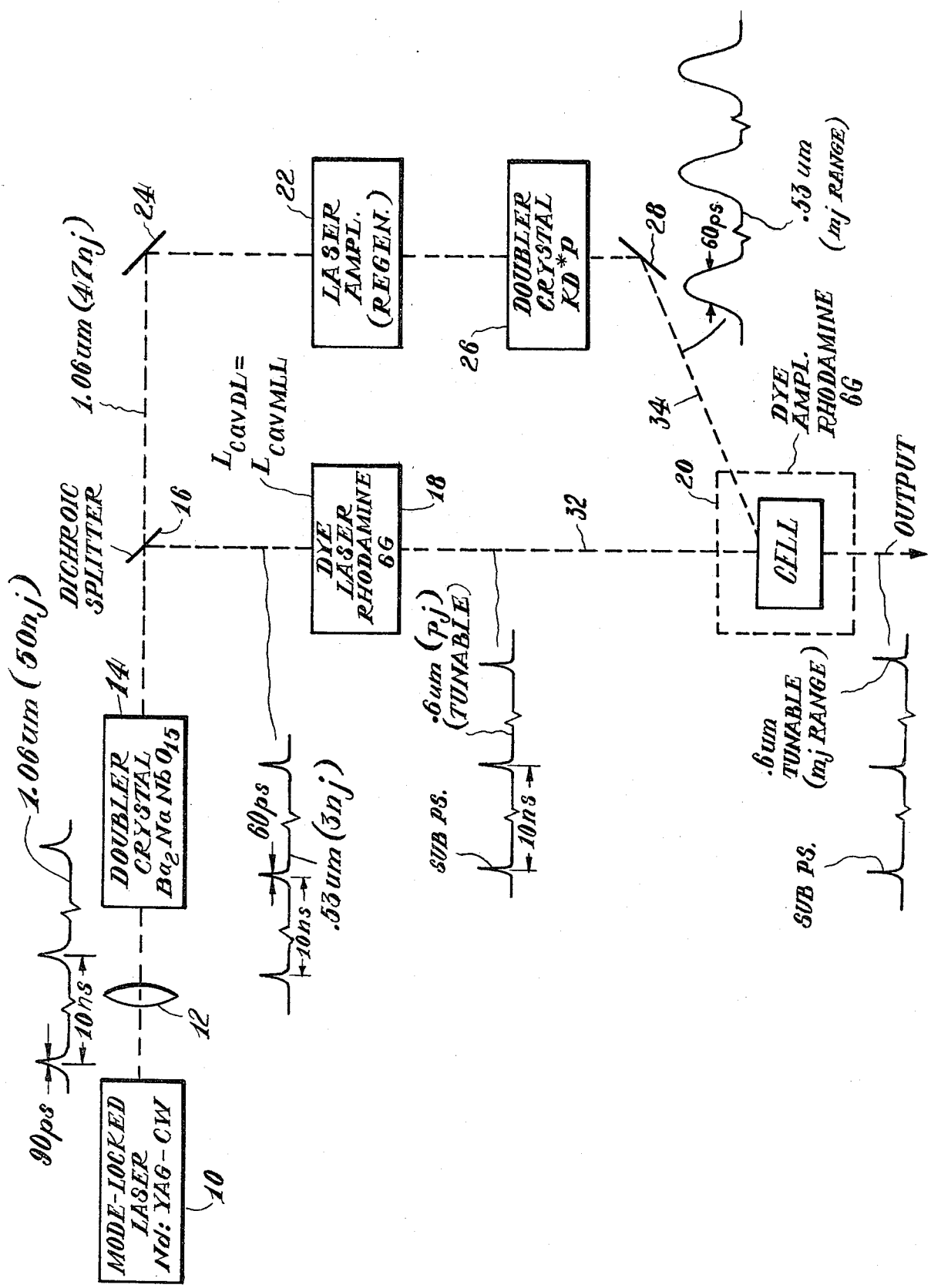

LASER SYSTEM USING ORGANIC DYE AMPLIFIER

DESCRIPTION

The present invention relates to a laser system using an organic dye amplifier and particularly to a system for the generation of high-power, ultra-short laser pulses.

The present invention is especially suitable for use in generating high-power, ultra-short laser pulses for operating optoelectric devices such as light activiated semiconductor switches. The invention is also suitable for use in generating ultra-short pulses of visible and shorter wave lengths through the use of longer wavelength laser pulses such as pulses in the infra-red wave lengths (i.e., frequency conversion). Such short pulses as may be generated through the use of the present invention may find application in inertial confinement fusion systems (viz., laser fusion systems).

The generation of laser pulses of ultra-short duration (in the picosecond and sub-picosecond range) with high-power (energy in the milli-joule range) is difficult to accomplish because of the build up of amplified spontaneous emission (ASE) which reduces the efficiency and perturbs the quality of the output laser pulse. Dye cell amplifiers capable of amplifying and producing picosecond pulses have been reported. They require multi-stage flash lamp pump amplifiers or produce relatively little power (see Adrain, Arthurs, Bradley, Roddi and Taylor, *Opt. Comm.* 14, 12, 140 (1974); Schmidt, *Opt. Comm.* 287 (1975); Ippen & Shank, article entitled "Subpico Seconds Spectroscopy" in the Text, *Pico Second Phenomenon.* F. L. Shapiro, Editor. Springer-Verlag publisher; Goldberg and Moore article entitled "Synchronous mode-locked Dye Lasers For Picosecond Spectroscopy and Nonlinear Mixing", in the text *Laser Spectroscopy*, H. Walter, Editor, Springer-Verlag publisher; Huppert and Rentzepis, *J. App, Phys.* 49 543 (1978); and Taira and Yajima, *Opt. Comm.* 29 115 (1979)).

It is a feature of the present invention to provide an improved laser system which generates ultra-short duration laser pulses which are of high power and of high quality in terms of the temporal and spatial uniformity of the pulses, with high efficiency.

It is another feature of the present invention to generate high power ultra-short pulses in a laser system using an organic dye amplifier in which the input or signal laser pulse to the amplifier is amplified before ASE, which reduces the quality of the laser pulse and system efficiency, can build up.

It is another feature of the invention to avoid the build up of ASE in an organic dye amplifier by synchronizing the input signal pulse to the dye cell of the amplifier with a laser pulse which pumps the amplifier so that the population inversion occurs and then the signal pulse occurs so as to obtain the amplification or gain effect as soon the population inversion has been completed. Such synchronization and timing of the signal and pump pulses is, in accordance with the invention obtained by deriving both pulses from the same source. This source may be an infra-red laser such that the system is operative to convert infra-red laser pulses into laser pulses in the visible and other shorter wave length ranges which dye lasers and dye cell amplifiers are capable of providing.

Briefly described, a laser system for generating high-power, ultra-short laser pulses in accordance with the invention makes use of a mode locked CW laser, first and second doublers, a dye laser, a laser amplifier, and a dye amplifier having a dye cell. The mode locked laser is in pumping relationship with the dye laser via the first doubler and in driving relationship with the laser amplifier. The dye laser is in driving relationship with the dye cell amplifier and the laser amplifier is in pumping relationship with the dye cell amplifier via the second doubler. Precise timing relationship between the dye cell pump pulses and the input signal pulses from the dye laser are obtained so that the pulses arrive at the dye amplifier at exactly the correct times for optimum amplification of the signal pulses without build up of ASE.

The foregoing and other objects features and advantages of the invention will become more apparent from a reading of the following description in connection with the accompanying drawing; the sole FIGURE of which is a block diagram of a laser system embodying the invention.

Referring to the drawing, a continuous wave (CW) infra-red laser 10, suitably an Nd:YAG laser produces output pulses repeatedly. For the exemplary Nd:YAG laser these pulses are approximately 1.06 micrometers in wave length, 90 picoseconds in duration and approximately 50 nanojoules in energy. They occur at 10 nanosecond intervals. The laser beam of these pulses is focused by a lens 12 on to a doubler crystal 14. The doubler crystal is preferably a barium sodium niobate crystal ($Ba_2NaNbO_{15}$). The crystal transforms the infra-red laser radiation to visible radiation of wavelength approximately 0.53 micrometer with high efficiency. The converted pulses are in the visible (green), are of approximately 60 picoseconds duration and have an energy of approximately 3 nanojoules. All durations referred to herein are at the full width, half maximum (FHWM) of the pulses.

Not all of the energy of the infra-red pulses is converted in the doubler 14. Most of the energy, approximately, 47 nanojoules, is separated from the green, approximately 0.53 micrometer, energy by a dichroic beam splitter 16. The 0.53 micrometer pulses pump a dye laser, which in this embodiment of the invention has a three mirror cavity of the type described in Dienes et al. U.S. Pat. No. 3,731,224 issued May 1, 1973. The length of this cavity is preferably equal to or one half of the length of the cavity in the mode locked laser 10 so that the output signal pulses from the dye laser 18 are synchronous and particularly simultaneously occurring, with the mode locked laser pump pulses which are applied to the dye laser 18.

The dye laser 18 has a liquid dye cell which may be a jet stream of dye solution therein which is selected in accordance with the frequency desired for the output laser pulses from the system. In this illustrative and preferred embodiment of the invention the dye used is rhodamine 6G which produces sub-picosecond signal pulses of approximately 0.6 micrometer wave length. An etalon or other tuning device may be used to tune the frequency of the dye laser output pulses. These pulses remain synchronous and simultaneously occurring with the mode locked laser output pulses.

The beam of pulses from the dye laser is applied as the input signal to a dye amplifier 20 containing a dye cell of the same liquid, organic dye as used in the dye laser. This cell may also be a jet stream of dye solution. In this exemplary, preferred embodiment, the cell in the dye amplifier 20 contains rhodamine 6G. The input signal pulses to the dye cell amplifier 20 from the dye laser 18 are very low in power and are in the picojoule range.

The dye amplifier 20 is pumped in synchronism with the signal pulses from the dye laser. The pumping energy is obtained from a laser amplifier 22. This laser amplifier is an infra-red amplifier and may be optically pumped. However, it is preferable to use a regenerative amplifier. Such amplifiers use a regenerative cavity where a relatively low energy pulse which is reflected into the cavity by a mirror 24 is amplified by many passes through an amplification medium within the cavity. Such regenerative amplifiers are known in the art, and reference may be had to Emmett, U.S. Pat. No. 4,191,928, issued Mar. 4, 1980 for further information respecting regenerative amplifiers.

The dye cell in the dye cell amplifier 20 has an absorption spectrum which peaks at approximately half the infra-red wave length of the output pulses from the laser amplifier 22. Accordingly, a doubler crystal 26 is used. This crystal is preferrably a KD*P crystal. Both doubler crystals 14 and 26 may be tuned by supporting them in temperature controlled ovens. The pump pulses in the millijoule range from the doubler crystal 26 are directed by a mirror 28 into the cell of the dye amplifier 20. Because the pump pulses and the signal pulses which are applied to the cell 20 are derived from the same mode locked laser 10 and the optical path length in this system are controllable, they may be made to occur in essentially simultaneous time relationship as shown in the wave forms adjacent to the optical paths 32 and 34 to the dye amplifier 20. The signal pulse occurs substantially simultaneously with the leading edge of the pump pulse. Population inversion in the dye cell of the amplifier 20, therefore, occurs substantially simultaneously with the arrival of the signal pulse. The signal pulse rather than the ASE benefits from the gain in the dye cell amplifier 20, and efficient amplification results therein. The output pulses from the dye amplifier 20 are sub-picosecond pulses of the same frequency as the input signal pulses thereto. The output pulses, however, are high power in the millijoule range. The quality of the beam containing the pulses is also high, since ASE build up which tends to spread laterally through the dye cell is avoided.

Variations and modifications in the herein described system, within the scope of the invention, will undoubtedly suggest themselves to those skilled in the art. Accordingly the foregoing descriptions should be taken as illustrative and not in a limiting sense.

I claim:

1. A laser system for generating high energy, ultra short laser pulses which system comprises: a dye amplifier; means for applying a laser signal pulse of duration in the pico and sub-pico second range to be amplified by said dye amplifier; and means for applying a pump laser pulse to said dye amplifier synchronously with said signal pulse such that said signal pulse reaches said dye amplifier substantially simultaneously with the completion of population inversion in said dye amplifier whereby the high energy pulses which are in the millijoule range and which are of ultra short duration are generated by said dye amplifier.

2. The invention as set forth in claim 1 to wherein applying means for said signal pulse includes means for applying said signal pulse such that it occurred substantially simultaneously with the leading edge of said pump pulse.

3. The invention as set forth in claim 2 wherein means are provided for generating said signal pulse with duration in the pico and sub-picosecond range.

4. The invention as set forth in claim 1 wherein said signal pulse generating means comprises a first laser with a first cavity length, and a second laser with a second cavity length, said first and second cavity lengths being in relationship selected from one to one and one-half to one with each other, and means for applying output pulses from said first laser to pump said second laser, said second laser providing said signal pulses.

5. The invention as set forth in claim 4 further comprising means for generating said pump pulses which comprises said first laser and a laser amplifier, and means for applying said output pulses from said first laser to said laser amplifier.

6. The invention as set forth in claim 5 wherein said first laser is a mode locked CW laser, said second laser is a dye laser, said signal pulse generating means further comprises first means for doubling the frequency of said first laser output pulses, and said means for applying said first laser output pulses to said dye laser comprises means for applying said doubled frequency pulses thereto, and wherein said means for applying said pump pulses from said laser amplifier to said dye amplifier comprises second means for doubling the frequency of said pump pulses.

7. The invention as set forth in claim 6 wherein said dye amplifier includes a dye cell containing a dye having an absorption spectrum which peaks at about twice said frequency of said first laser output pulses.

8. The invention as set forth in claim 7 wherein said dye cell contains rhodamine 6G liquid and said dye laser has a cell therein also containing rhodamine 6G liquid.

9. The invention as set forth in claim 7 wherein said first doubling means is a barium sodium niobate crystal.

10. The invention as set forth in claim 9 wherein said second doubling means is a KD*P crystal.

11. The invention as set forth in claim 7 wherein said laser amplifier is a regenerative amplifier.

12. The invention as set forth in claim 10 wherein said mode locked laser output pulses are in the range of 10's of picoseconds in duration, and have energy in the 10's of nanojoule range, said signal pulses are in the pico and sub-picosecond duration range and have energy in the picojoule range, and said pump pulses from said second doubling crystal means have energy in the milli-joule range.

13. A laser amplifier system comprising: a mode locked CW laser, a first doubling crystal, a dye laser, a laser amplifier, a second doubling crystal, a dye amplifier having a dye cell, said mode locked laser being in pumping relationship with said dye laser via said first doubling crystal and in driving relationship with said laser amplifier, said dye laser being in driving relationship with said dye cell, and said laser amplifier being in pumping relationship with said dye cell via said second doubler crystal.

14. The invention as set forth in claim 13 wherein said first doubler crystal is a barium sodium niobate crystal.

15. The invention as set forth in claim 14 wherein said second doubler crystal is a KD*P crystal.

16. The invention as set forth in claim 13 wherein said mode locked laser has a Nd active laser medium laser medium, and said dye laser includes rhodamine 6G liquid as the laser medium therein.

17. The invention as set forth in claim 13 wherein said laser amplifier is a regenerative amplifier.

18. The invention as set forth in claim 13 wherein a dichroic mirror reflects laser light from said mode locked laser which passes through said first doubler at doubled frequency to said dye laser and at fundamental frequency to said laser amplifier.

19. A laser system for the generation of sub-picosecond pulses which comprises a mode locked CW laser for producing a train of pulses of duration in the picosecond range, a non-linear frequency changing crystal, a dye laser, said crystal changing the frequency of said pulses from said CW mode locked laser and applying said frequency changed pulses to said dye laser to pump said dye laser whereby said dye laser produces said train of said sub-picosecond pulses.

20. The laser system according to claim 19 wherein said mode locked laser is an Nd: YAG laser.

21. The laser system according to claim 19 wherein said crystal is a barium sodium niobate crystal.

22. The system according to claim 21 wherein said CW mode locked laser is an Nd: YAG laser, said crystal is operative as a frequency doubler and said dye laser has a Rhodamine 6G laser medium.

* * * * *